METHOD OF FORMING AN ECONOMIC OPTICAL WAVEGUIDE FIBER

Original Filed Jan. 3, 1972

United States Patent Office

Re. 28,028
Reissued June 4, 1974

28,028

METHOD OF FORMING AN ECONOMIC OPTICAL WAVEGUIDE FIBER

Robert D. Maurer, Painted Post, N.Y., assignor to Corning Glass Works, Corning, N.Y.

Original No. 3,737,293, dated June 5, 1973, Ser. No. 214,842, Jan. 3, 1972. Application for reissue June 21, 1973, Ser. No. 372,086
Int. Cl. C03c *25/06*
U.S. Cl. 65—3 18 Claims

Matter enclosed in heavy brackets [ ] appears in the original patent but forms no part of this reissue specification; matter printed in italics indicates the additions made by reissue.

ABSTRACT OF THE DISCLOSURE

A method of forming an optical waveguide by first forming a coating of glass on the inside wall of a glass tube, the glass tube and the first coating being of substantially similar material. Thereafter, a second coating of glass is applied to the inside wall of the glass tube over the first coating, said second coating having a preselected different index of refraction from that of the first coating. The glass tube and coating combination is thereafter drawn to reduce the cross-sectional area and to collapse the second and inner coating of glass to form a fiber having a solid cross-sectional area. The collapsed inner coating forms the fiber core and the first coating forms the cladding for the fiber while the exterior glass tube provides structural strength for the fiber.

BACKGROUND OF THE INVENTION

I. Field of the invention

Waveguides used in optical communications systems are herein referred to as optical waveguides" and are normally constructed from a transparent dielectric material such as glass or plastic,.

It is well known to one skilled in the art that light can be caused to propagate along a transparent fiber structure which has a higher refractive index than its surroundings. The ordinary use of such optical fibers is to transmit a signal or an image, that is light which has been modulated in some form, from one point to another. Optical fibers produced for these purposes must avoid excessive attenuation of the transmitted light to be effective. However, to be an effective transmitting media for an optical communications system, an optical waveguide should not only transmit light without excessive attenuation, but should be constructed to minimize cross-talk from adjacent waveguides. In addition, such an optical waveguide should not cause dispersion of the transmitted light, and should allow only preselected modes of light to propagate along the fiber.

Operational theories and other pertinent information concerning optical waveguides may be found in U.S. Pat. No. 3,157,726 issued to Hicks et al.; in the publication entitled "Cylindrical Dielectric Waveguide Mode" by E. Snitzer, Journal of the Optical Society of America, Vol. 51, No. 5, pages 491–498, May 1961; and in "Fiber Optics Principles and Applications" by N. S. Kapany, Academic Press (1967).

The propagation of light waves is governed by the same laws of physics that govern microwave propagation and, therefore, can also be studied in terms of modes. Since each mode of light traveling along a glass fiber structure propagates at its own inherent velocity, it can be shown that information initially supplied to all modes will be dispersed after traversing a given length of fiber due to different propagation velocities. If light propagation along an optical fiber could be restricted to preselected modes, clearly more effective information transmission would result.

The conditions under which propagation of a particular mode will no longer be localized within the core of an optical fiber can be expressed in terms of a cutoff value U. A fiber characteristic term R may be expressed in terms of optical fiber variables by the equation $$R=\frac{2\pi a}{\lambda}\sqrt{n_1^2-n_2^2} \qquad (1)$$

where
a=core radius of the waveguide
$\lambda$=wavelength of light to be transmitted
$n_1$=core index of refraction
$n_2$=cladding index of refraction.

This equation can be rewritten as $$R=\frac{2\pi a}{\lambda}\sqrt{(n_1+n_2)(n_1-n_2)} \qquad (2)$$

R must be greater than or equal to the cutoff value U for a particular mode to propagate within a given optical fiber.

The mode $HE_{11}$, the definition and physical characteristics of which can be found in the heretofore noted publications, is the only mode of light that will propagate along a fiber which has an R value of less than 2.405. Therefore, if R is set equal to 2.405 in equation (2), it can be seen that a method of limiting light propagation of a desired wavelength to one mode is accomplished by coordinating parameters "a," "$n_1$" and "$n_2$" of the waveguide. That is, if the difference between the two indices of refraction $(n_1-n_2)$ increases, the core radius "a" must decrease, and if $(n_1-n_2)$ decreases, the core radius "a" must increase. Producing waveguides having core and cladding indices of refraction within limits necessary to maintain single mode propagation is difficult even for waveguides with very small cores. The difficulty is markedly increased in producing waveguides with larger cores. As an example, if the optical waveguide is to have a small core, that is a core diameter of approximately one $\mu$m., the required difference in the two indices of refraction will be on the order of $10^{-2}$. If the optical waveguide is to have a large core, that is a core diameter of approximately one millimeter, the required difference in the two indices of refraction would be even smaller, that is, on the order of $10^{-8}$.

The intensity of light in an optical waveguide decreases as the radial distance from the waveguide center increases. Theoretically, of course, this intensity will never be zero regardless of the radial distance from the waveguide center. However, by proper selection of the core diameter, and the core and cladding indices of refraction, the decrease in intensity can be made to be so rapid that the intensity can be presumed to be zero at a finite radial distance. There is no intensity distribution common to all waveguides, and intensity distribution will vary with the core diameter, the index of refraction of the core and cladding glass, and with the frequency of the light being transmitted, that is, within the same waveguide infrared light will have a different intensity distribution than will ultraviolet light.

If light intensity has not decreased to a very low level when it reaches the interface between the cladding and the medium surrounding it, at least three undesirable results may occur. First, light could strike such interface, be scattered, and then be reflected back into the waveguide core region. Second, some of the transmitted light could strike the interface and escape from the optical waveguide. Third, some of the escaped light could penetrate an adjacent optical waveguide thereby causing cross-talk.

Producing a satisfactory optical waveguide has been one of the more difficult problems in the development of an effective optical communications system.

II. Description of the prior art

A method heretofore used for producing an optical fiber is described as follows. A rod of glass possessing the desired core characteristics was inserted into a tube of glass possessing the desired cladding characteristics. The temperature of this combination was then raised until the viscosity of the materials was low enough for drawing. The combination was then drawn until the tube collapsed around and fused to the inside rod. The resulting combination rod was then further drawn until its cross-sectional area was decreased to the desired dimensions. During the drawing process, the rod and tube would normally be fed at different speeds to attempt to produce a fiber with the desired core to cladding diameter ratio. This method, however, has been sometimes unsatisfactory because of the particular difficulty in maintaining the core and cladding dimensions. An additional problem is that numerous tiny air bubbles and foreign particles are often trapped at the core and cladding interface and become a source of light scattering centers. In addition, the core and cladding materials of any waveguide must be selected so that there is a precise difference between the two indices of refraction. Glass tubes and glass rods which simultaneously have precise differences in their indices of refraction, similar coefficients of expansion and similar viscosities are not readily available. Variations in core diameter or in either index of refraction may significantly affect the transmission characteristics of a waveguide.

Another method of forming an optional waveguide is described in U.S. Patent application Ser. No. 36,267, filed May 11, 1970 by D. B. Keck and P. C. Schultz and is assigned to a common assignee. That patent application teaches a method of producing an optical waveguide wherein a single film of material is applied to the inside surface of a tube with the composite structure thereafter being heated and drawn to form a waveguide fiber.

As heretofore noted, the intensity of light in an optical waveguide decreases as the radial distance from the waveguide center increases, and that by proper selection of waveguide parameters, the decrease in intensity can be made to be rapid. Accordingly, only a small quantity of cladding material is needed to provide sufficient cladding thickness for achieving the optical requirements of a waveguide fiber. However, a large quantity of cladding material is nevertheless needed to provide adequate structural strength for the fiber. Since a very pure cladding material is needed for optical purposes, and heretofore known methods provided only one cladding material, a large quantity of very pure cladding material has been needed to achieve both purposes.

SUMMARY OF THE INVENTION

It is an object of the present invention to provide an optical waveguide and a method for economically producing it which overcome the heretoforce noted disadvantages.

Other objects of the present invention are to provide a method for producing an optical waveguide that will not cause excessive light absorption losses, that will not cause excessive dispersion in the transmitted light, that will minimize cross-talk between adjacent fibers, that prevents the formation of light scattering centers at the core and cladding interface and otherwise improves the interface, and that requires a minimum of very pure cladding material.

Broadly, according to this invention an optical waveguide is produced by applying a first coating of material on the inside wall of a glass tube. The materials of the coating and of the glass tube may be the same or similar basic materials. This first coating is a glass possessing the optical and phyical qualities desired of the waveguide cladding. A second coating of material is then applied to the inside of the glass tubing over the first coating. This second coating is a glass possessing the optical and physical qualities desired of the waveguide core. The composite structure is then heated until the structure reaches a temperature at which the materials have a low enough viscosity for drawing and is then drawn to reduce the diameter thereof until the second or inner coating of glass is collapsed, that is it seals the longitudinal hole to form a rod surrounded by the first coating of cladding material which in turn is surrounded by the material of the glass tube. Thereafter, continued drawing of the composite rod further reduces the diameter thereof to form a glass optical fiber which possesses the characteristics of the desired optical waveguide. That is, it transmits preselected modes of light without excessive attenuation or absorption losses, minimizes cross-talk between adjacent optical waveguides, does not cause excessive dispersion of the transmitted light, provides an improved cladding-core interface, and decreases the quantity of pure cladding material necessary.

These and additional objects, features, and advantages of the present invention will become apparent to those skilled in the art from the following detailed description and the attached drawing, on which, by way of example, only the preferred embodiments of this invention are illustrated.

DETAILED DESCRIPTION OF THE INVENTION

It is to be noted that the drawings are illustrative and symbolic of the invention and there is no intention to indicate scale or relative proportions of the elements shown therein.

Figure 1:
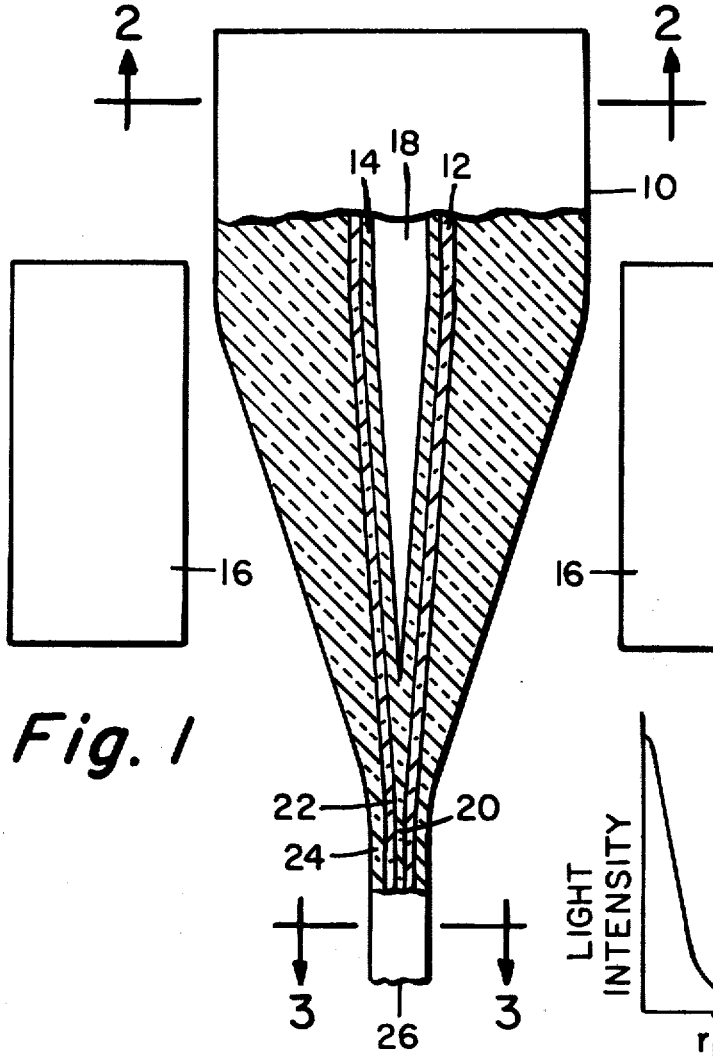
FIG. 1 is a fragmentary elevation partially in cross section illustrating an optical waveguide being formed in accordance with the present invention.
Figure 2:
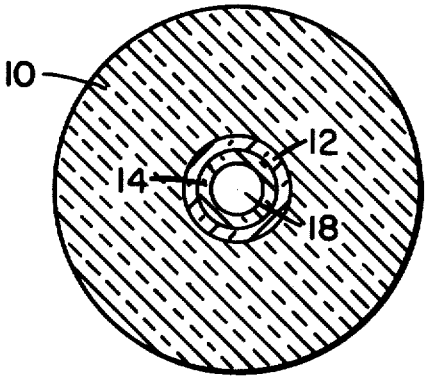
FIG. 2 is a cross section taken along line 2—2 of FIG. 1.

A thick wall tube 10, such as illustrated in FIGS. 1 and 2, serves as the exterior structural member of the optical waveguide. Since, as hereinafter will be explained, the intensity of the light propagated by the waveguide can be made to be substantially zero within the exterior structural portion formed from tube 10, the material of tube 10 need not be of the high purity required of the light propagating core or cladding material. The material of tube 10 may be normally produced glass having an ordinary or even an excessive level of impurities or entrapped bubbles that would render it unsuitable for effective light propagation, however, it must have a viscosity and coefficient of expansion compatible with the waveguide cladding and core materials.

Tube 10 may be produced by core drilling a solid rod of material such as glass. The rough surfaces left by drilling may be smoothed by one or more methods such, for example, as laser milling the inside surface, mechanically polishing the inside surface, fire polishing the inside surface, washing the tube in hydrofluoric acid, or the like. A particularly suitable method of smoothing the inside wall of tube 10 comprises first mechanically polishing the rough surface left by core drilling and thereafter flame polishing the mechanically polished surface. Hydrofluoric acid washing of the surface before and after all polishing operations is desirable to avoid contamination.

After the inside surface of tube 10 is smoothed, a first coating 12 of glass is applied thereto. As will be hereinafter described, this first coating will ultimately comprise the cladding for the optical fiber, therefore, it must be formed of suitable optical quality glass having desired physical and optical qualities such as viscosity, coefficient of expansion, index of refraction, and purity.

The core of an optical waveguide should be produced from an optical quality glass having a higher index of refraction than the cladding while having physical characteristics similar to the cladding. Accordingly, the same or similar type of glass used for the cladding but doped with a small amount of some other material to slightly increase the index of refraction thereof is suitable for use as the core glass. For example, if pure fused silica is used as the cladding glass, fused silica doped with a material to increase its index of refraction can be used as the core glass. There are many possible materials that can satisfactorily be used as doping materials alone or in combination with each other. Examples of some suitable dopants are titanium oxide, tantalum oxide, tin oxide, niobium oxide, zirconium oxide, aluminum oxide, lanthanum oxide, *and* germanium oxide [, and boron oxide]. A particularly suitable core glass is fused silica doped with titanium oxide. The amount of dopant used should be kept to a minimum for various reasons. First, since additional doping material would cause the index of refraction to increase, the difference between the index of refraction of the cladding glass and the core glass will also increase requiring a decrease in the allowable core diameter of the waveguide as herein explained. Second, if an excessive amount of doping material is added to the base material, a loss in light transmission will result. Desirably, a small yet precise amount of dopant should be added to the base material for the primary purpose of changing the index of refraction. For the purposes of the present invention, the amount of dopant is preferably maintained below about 15 percent by weight of the total composition.

The waveguide core material is provided by applying a second coating 14 of glass to the inside surface of tube 10 over first coating 12. The desired first and second coatings, may be applied by a variety of methods including but not limited to radio frequency sputtering, sintering a coating of soot applied by the flame hydrolysis process, chemical vapor deposition, depositing a glass frit, and the like. Clearly, the first and second coatings may be applied by either the same or different methods.

A particularly effective means of applying either or both coatings 12 and 14 is a sinter a soot layer of the desired material applied by a flame hydrolysis process similar to that described in U.S. Pat. No. 2,272,342 issued to J. F. Hyde or U.S. Pat. No. 2.326,059 issued to M. E. Nordberg. A modification of the Nordberg process that will provide a very pure fused silica coating on the inside wall of glass tube 10 suitable for first coating 12 which will form the waveguide cladding is as follows. Dry oxygen is bubbled through a tank containing liquid silicon-tetrachloride, $SiCl_4$ at a temperature of approximately 35° C. $SiCl_4$ vapors picked up by the oxygen are then passed through as gas-oxygen flame where they are hydrolyzed to form a soot, that is, minute glass particles of very pure $SiO_2$. The glass soot leaves the flame in a steady stream and is deposited on the inside wall of the glass tube by directing the stream of soot at an open end of the tube. The thickness of the soot layer is controlled by the flow rates, distance between the glass tube and the flame, inside diameter of the glass tube, and the time allowed for deposition. Uniformity of the soot layer is greatly enhanced if a slight vacuum is applied to the end of the tube opposite the flame. The tube and the soot are then heated until the soot sinters resulting in a thin coating of fused silica glass bonded to the inside wall of the tube.

The Nordberg process may be similarly modified to provide a titanium doped fused silica coating on the inside wall of glass tube 10 suitable for second coating 14 which will form the waveguide core. For this second coating, dry oxygen is bubbled through a tank containing a liquid mixture of approximately 53 percent by weight silicon-tetrachloride, $SiCl_4$ and 47 percent by weight titanium-tetrachloride, $TiCl_4$, which mixture is at a temperature of approximately 35° C. $SiCl_4$ and $TiCl_4$ vapors picked up by the oxygen are then passed through a gas-oxygen flame where they are hydrolyzed to form a soot, that is, minute glass particles with a composition of approximately 95 percent by weight $SiO_2$ and 5 percent by weightj $TiO_2$. The glass soot leaves the flame in a steady stream and is deposited on the inside wall of a glass tube by directing the stream of soot at an open end of the tube. The thickness and uniformity of the soot layer is controlled as described in connection with first coating 12. The tube and the soot are then heated until the soot sinters resulting in a thin coating of titanium doped fused silica glass bonded to the first coating applied to the inside wall of the tube.

Although the hereinabove soot process is described as having the first soot layer sintered before the second soot layer is applied, it will be understood that the second soot layer may be applied directly over the first soot layer and both layers may be sintered simultaneously to form respective coatings 12 and 14.

Figure 3:
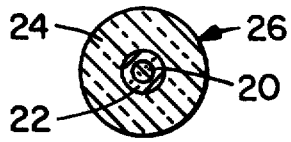
FIG. 3 is a cross section taken along line 3—3 of FIG. 1.

After first and second glass coatings 12 and 14 are applied to the inside wall surfaces of thick wall glass tube 10 as shown in FIGS. 1 and 2, the composite structure is heated by furnace 16 until tube 10 and coatings 12 and 14 reach a temperature at which the materials have a viscosity low enough for drawing. The structure is then drawn until longitudinal hole 18 collapses, that is the core glass of second coating 14 fills hole 18 to form a solid core 20 surrounded by cladding 22 which in turn is surrounded by thick wall tube 24. Thereafter, continued drawing of the composite rod further reduces the diameter thereof to form a glass optical fiber 26 as additionally illustrated in FIG. 3, which fiber 26 possesses the characteristics of the desired optical waveguide.

As will be understood, the sintering of both layers of soot or just the second layer of soot together with the drawing step may be performed during the same heating operation, if desired.

Figure 4:
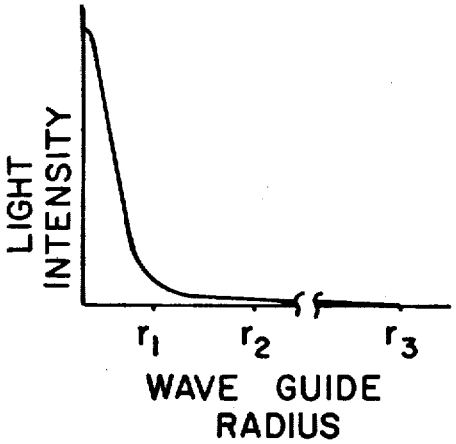
FIG. 4 is a graph illustrating the light intensity distribution as a function of the radial distance from the center of an optical waveguide.

The intensity of light in an effective optical waveguide decreases rapidly as the radial distance from the core center increases. Therefore, if the intensity approaches zero at a distance from the core center that is less than the radius of the waveguide cladding, then the waveguide will not be noticeably affected by cross talk and phase shift problems. The waveguide parameters may be chosen such that the cladding and core diameters within which the light intensity approaches zero are so small as to be hard to handle, wherefore, thick wall tube 24 is necessary to provide adequate structural strength. Referring additionally to FIG. 4, the radial distance $r_1$ represents the radius of the waveguide core, $r_2$ represents the outer radius of the waveguide cladding and $r_3$ represents the outside radius of the waveguide, that is the outside radius of tube 24. The light intensity is shown as being substantially wholly within the core and decreasing almost to zero at the outside diameter of the cladding as is necessary for an effective optical waveguide.

To limit light propagation along an optical waveguide to preselected modes, the core diameter, the core index of refraction, and the cladding index of refraction must be coordinated according to equation (2). The following is an example of coordinated values of the core radius "a," the core index of refraction $n_1$, and the cladding index of refraction $n_2$. If fused silica is chosen to be the cladding glass, the index of refraction of the cladding would be approximately 1.4584 which is the index of refraction of fused silica for sodium light having a wavelength $\lambda=5893$ A. Further, if the percentages of $SiO_2$ and $TiO_2$ are selected such that the core glass has a resulting index of refraction of 1.466, the core radius necessary to limit light propagation to the $HE_{11}$ mode within the optical waveguide is determined by solving the equation $$R=\frac{2\pi a}{\lambda}\sqrt{n_1^2-n_2^2}$$

where

R=2.405, the cutoff value for single light mode $HE_{11}$,
a=radius of the core
λ=wavelength of transmitted light (sodium light=5893 A),
$n_1$=core index of refraction=1.466,
$n_2$=cladding index of refraction=1.4584.

Upon solving the above equation using the listed parameters, it is seen that the core radius "a" should be equal or less than 1.5 μm. in order to limit light propagation to the $HE_{11}$ mode.

It has been found that light absorption properties may be decreased and light transmission qualities improved in titanium oxide doped fused silica formed into optical waveguides if the waveguides are drawn in an oxygen atmosphere and thereafter heat treated in a suitable oxygen, nitrogen, or the like atmosphere. Heat treatment may consist of heating the waveguide in an oxygen atmosphere to between 500° C. and 1100° C. for not less than 0.5 minute with the length of treatment being related to the treatment temperature. Lower temperatures require longer treatment periods while treatment at higher temperatures allows shorter time periods.

As can be seen from the foregoing and FIG. 4 of the drawing, the light propagated through the optical waveguide is substantially entirely propagated through the core with very little light being propagated through the cladding much less the surrounding structural tubing. It is seen, therefore, that only the core and cladding materials need to be of very pure material to provide the optical properties needed for desired light propagation through the waveguide. As will be readily understood, the production of such very pure materials is one of the principal difficulties in the development to perfection of a satisfactory optical waveguide for an effective optical communications system. However, a satisfactory optical waveguide can be produced by limiting the amount of very pure materials used in the production of such an optical waveguide to first and second coatings 12 and 14 only, while thick glass tube 10 is formed of the same or similar base material but embodying normal production impurities and entrapped bubbles, if any. The fact that the thick wall tubing 10 may have undesirably high impurities would in no way affect the light propagation through the waveguide, yet would provide the necessary strength for structural integrity of the waveguide. On the other hand, first and second coatings 12 and 14 respectively, which ultimately comprise core 20 and cladding 22, embody only that quantity of very pure material which is necessary to achieve the substantially total light propagation through the core and cladding.

By the expression "very pure material" is meant, in the case of the core material, very pure base glass, such for example as fused silica, doped as necessary to increase the index of refraction thereof to provide an effective optical waveguide. Similarly, with reference to the cladding material, the expression means very pure undoped base glass or very pure base glass doped to such a degree as to provide the desired difference in index of refraction between the core and the cladding.

A specific example of a waveguide produced in accordance with the present invention is as follows. A ¾ inch diameter hole is drilled along the longitudinal axis of a 1¼ inch diameter rod of fused silica having a length of approximately 5 inches. The fused silica rod is produced by any ordinary well known commercial method and may have the normal impurities of such a product. The rough surface left by drilling is then mechanically polished and the mechanically polished surface is thereafter flame polished to produce a very smooth surface on the inside wall of the tube. Hydrofluoric acid washing is performed before and after each polishing step.

A first layer of a soot of pure fused silica is then applied to the inside wall by the heretofore described modified flame hydrolysis process. This glass soot layer is approximately 2800 μm. thick and is substantially 100 percent pure fused silica. The structure so formed is then heated to and maintained at approximately 1450° C. until the deposited glass soot is sintered resulting in a 650 μm. thick coating of pure fused silica well bonded to the inside wall of the tube. Thereafter, a layer of soot of fused silica doped with titanium oxide is applied to the inside tube surface over the first coating of pure fused silica by the same modified flame hydrolysis process heretofore described. This glass soot layer is approximately 28 μm. thick and is approximately 94.75 percent fused silica and 5.25 percent titanium oxide. The resulting structure is again heated to and maintained at approximately 1450° C. until the second deposited glass soot layer is sintered resulting in a second thin coating of titanium oxide doped fused silica well bonded to the first thin coating of pure fused silica. The sintered second coating has a thickness of about 7 μm.

The composite structure is then further heated in substantially an oxygen atmosphere until it reaches a temperature of approximately 1900° C., at which temperature the materials have a viscosity sufficiently low for drawing. The composite structure is then drawn to reduce the diameter thereof until the inner coating of titanium oxide doped fused silica collapses, that is, it seals the longitudinal hole to form a solid core surrounded by pure fused silica which in turn is surrounded by the relatively thick walled ordinary fused silica. The drawing of the rod continues until the outside diameter thereof is approximately 150 μm. The core of the optical waveguide is approximately 4 μm. in diameter and has an index of refraction of approximately 1.466, while the cladding layer has a diameter of approximately 40 μm. and an index of refraction of approximately 1.4584. The fiber is thereafter heat treated at approximately 800° C. in an oxygen atmosphere for approximately 3 hours.

An optical fiber produced by the method described in this example results in an economic optical waveguide suitable for the propagation of a single light mode, namely, the $HE_{11}$ mode, without excessive attenuation, and very little susceptibility to signal dispersion and cross talk.

Although the present invention has been described with respect to specific details of certain embodiments thereof, it is not intended that such details be limitations upon the scope of the invention except insofar as set forth in the following claims.

I claim:

1. A method of forming a clad optical fiber comprising the steps of providing a glass tube, applying a first coating of glass to the inside wall surface of said tube, applying a second coating of glass to the inside wall surface of said tube over said first coating, said second coating of glass having an index of refraction higher than that of said first coating, heating the structure so formed to the drawing temperature of the materials thereof, and drawing the heated structure to reduce the cross-sectional area thereof and collapse said second coating of glass to form a clad fiber having a solid cross-section, said collapsed second coating forming the core of said fiber.

2. The method of claim 1 wherein said first coating of glass is formed by the steps comprising depositing a layer of glass soot on the inside wall of said glass tube by flame hydrolysis, and heating said tube and glass soot until said soot sinters.

3. The method of claim 2 wherein said second coating of glass is formed by the steps comprising depositing a second layer of glass soot on the inside wall of said glass tube over said first coating by flame hydrolysis, and heating said tube, first coating, and said second layer of glass soot until said second layer of soot sinters.

4. The method of claim 3 wherein sintering said second layer of soot and drawing the composite structure is accomplished during the same heating step.

5. The method of claim 1 wherein the first or second coating of glass is applied by radio frequency sputtering.

6. The method of claim 1 wherein the first or second coating of glass is applied by chemical vapor deposition.

7. The method of claim 1 wherein the first or second coating of glass is formed by applying a glass frit to the inside wall of said tube and thereafter sintering said frit.

8. The method of claim 1 wherein said first coating is fused silica and second second coating is fused silica doped with at least one material selected from the group consisting of titanium oxide, tantalum oxide, tin oxide, niobium oxide, zirconium oxide, aluminum oxide, lanthanum oxide, *and* germanium oxide [, and boron oxide].

9. The method of claim 1 wherein said heated structure is drawn in a substantially oxygen atmosphere.

10. The method of claim 1 further comprising the step of heat treating said clad optical fiber in an oxygen atmosphere.

11. The method of claim 1 further comprising the steps of drilling a solid rod of glass to form said tube, mechanically polishing the drilled surface of said tube, and flame polishing the mechanically polished surface.

12. The method of claim 1 wherein said first and second coatings of glass are formed by the steps comprising depositing a first layer of glass soot on the inside wall of said glass tube by flame hydrolysis, depositing a second layer of glass soot on the inside wall of said glass tube over said first layer of soot by flame hydrolysis, and heating said tube and first and second layers of glass soot until said glass soot sinters, said first sintered layer of soot forming in said first coating and said second sintered layer of soot forming said second coating.

13. The method of claim 12 wherein sintering said first and second layers of soot and drawing the composite structure is accomplished during the same heating step.

14. The method of claim 12 wherein said heated structure is drawn in an oxygen atmosphere.

15. The method of claim 12 further comprising the step of heat treating said fiber in an oxygen atmosphere.

16. The method of claim 12 wherein said first coating is fused silica and said core is fused silica doped with not more than 15 percent by weight titanium oxide.

17. The method of claim 12 wherein said first coating is fused silica and said second coating is fused silica doped with at least one material selected from the group consisting of titanium oxide, tantalum oxide, tin oxide, niobium oxide, zirconium oxide, aluminum oxide, lanthanum oxide, *and* germanium oxide [, and boron oxide].

18. The method of claim 12 further comprising the steps of drilling a solid rod of glass to form said tube, mechanically polishing the drilled surface of said tube, and flame polishing the mechanically polished surface.

References Cited

The following references, cited by the Examiner, are of record in the patented file of this patent or the original patent.

UNITED STATES PATENTS

| | | | |
|---|---|---|---|
| 2,272,342 | 2/1942 | Hyde | 65—18 X |
| 3,275,428 | 9/1966 | Siegmund | 65—31 X |
| 3,294,504 | 12/1968 | Hicks | 65—31 X |
| 3,331,670 | 7/1967 | Cole | 65—4 |
| 3,589,878 | 6/1971 | Achener | 65—60 X |
| 3,659,915 | 5/1972 | Maurer | 65—30 X |

ROBERT L. LINDSAY, Jr., Primary Examiner

U.S. Cl. X.R.

65—4, 13, 18, 61, DIG. 7; 117—46 FS